(12) United States Patent
Tiwari et al.

(10) Patent No.: US 8,673,036 B2
(45) Date of Patent: Mar. 18, 2014

(54) QUENCH CHAMBER ASSEMBLY FOR A GASIFIER

(75) Inventors: Prashant Tiwari, Niskayuna, NY (US); Gregory Michael Laskowski, Saratoga Springs, NY (US); Judeth Brannon Corry, Manvel, TX (US); Helge Burghard Herwig Klockow, Niskayuna, NY (US); Allyson Joy Jimenez-Huyke, Houston, TX (US); Shailesh Singh Bhaisora, Bangalore (IN); Steven Craig Russell, Houston, TX (US); Karl Hardcastle, Saratoga Springs, NY (US); Jennifer Lynn Moyer, Yuma, AZ (US); Scott Reginald Parent, Houston, TX (US); Yulianto Salahuddin Mohsin, Houston, TX (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/617,704

(22) Filed: Sep. 14, 2012

(65) Prior Publication Data

US 2013/0011307 A1 Jan. 10, 2013

Related U.S. Application Data

(62) Division of application No. 12/494,385, filed on Jun. 30, 2009, now abandoned.

(51) Int. Cl.
*B01J 7/00* (2006.01)
*C10J 3/08* (2006.01)
*C10J 1/08* (2006.01)

(52) U.S. Cl.
USPC ........... 48/61; 48/62 R; 48/197 R; 48/210; 261/110

(58) Field of Classification Search
USPC ............. 48/61, 62 R, 197 R, 210; 423/644; 261/110–112.2
See application file for complete search history.

(56) References Cited

U.S. PATENT DOCUMENTS 2,818,326 A 12/1957 Eastman et al.
4,218,423 A 8/1980 Robin et al.
(Continued)

FOREIGN PATENT DOCUMENTS

CN 101338223 A 1/2009
WO 2009023364 A2 2/2009

OTHER PUBLICATIONS

EP Search Report Dated Jun. 13, 2012.
(Continued)

*Primary Examiner* — Matthew Merkling
(74) *Attorney, Agent, or Firm* — Ann M. Agosti

(57) ABSTRACT

A gasifier includes a combustion chamber in which a fuel is burned to produce a syngas and a particulated solid residue. A quench chamber having a liquid coolant is disposed downstream of the combustion chamber. A dip tube couples the combustion chamber to the quench chamber. The syngas is directed from the combustion chamber to the quench chamber via the dip tube to contact the liquid coolant and produce a cooled syngas. A draft tube surrounds the dip tube such that an annular passage is formed between the draft tube and the dip tube. An asymmetric or symmetric faceted baffle is disposed proximate to an exit path of the quench chamber. The cooled syngas is directed through the annular passage and impacted against the baffle so as to remove entrained liquid content from the cooled syngas before the cooled syngas is directed through the exit path.

9 Claims, 16 Drawing Sheets

(56) References Cited

U.S. PATENT DOCUMENTS

| | | |
|---|---|---|
| 4,581,899 A | 4/1986 | von Klock et al. |
| 4,650,497 A | 3/1987 | Quintana |
| 4,778,483 A | 10/1988 | Martin et al. |
| 4,828,578 A | 5/1989 | Den Bleyker |
| 4,828,580 A | 5/1989 | Dach |
| 6,149,137 A | 11/2000 | Johnson et al. |
| 6,238,468 B1 | 5/2001 | Nilsson |
| 8,002,855 B2 | 8/2011 | Koehler et al. |
| 2009/0202403 A1 | 8/2009 | Jimenez-Huyke et al. |
| 2010/0325956 A1 | 12/2010 | Dinu et al. |
| 2010/0325957 A1 | 12/2010 | Klockow et al. |
| 2011/0120010 A1 | 5/2011 | Tiwari et al. |
| 2012/0131852 A1 | 5/2012 | Tiwari et al. |

OTHER PUBLICATIONS

Coleman R. Ferguson, James S. Falsettiand, William P. Volk, "Refining Gasification: Petroleum Coke to Fertilizer at Farmland's Coffeyvill, KS Refinery," AM-99-13; National Petrochemical & Refiners Association, 1999 Annual Meeting Mar. 21-23, 1999 Convention Center San Antonio, Texas, 9 pages.

US 8,673,036 B2

QUENCH CHAMBER ASSEMBLY FOR A GASIFIER

CROSS-REFERENCE TO RELATED PATENT APPLICATIONS

This application is a divisional of U.S. patent application Ser. No. 12/494,385 entitled "QUENCH CHAMBER ASSEMBLY FOR A GASIFIER," filed 30 Jun. 2009, which is herein incorporated by reference. This application is also related to the following co-pending U.S. patent applications having Ser. No. 12/494,434, entitled "COOLING CHAMBER ASSEMBLY FOR A GASIFIER" and Ser. No. 12/495,439, entitled "GASIFICATION SYSTEM FLOW DAMPING" assigned to the same assignee as this application and filed concurrently herewith, each of which is hereby incorporated by reference.

BACKGROUND

The invention relates generally to gasifiers, and more particularly to a quench chamber assembly for a gasifier.

In a normal coal gasification process, wherein a particulated carbonaceous fuel such as coal or coke or a carbonaceous gas is burned, the process is carried out at relatively hot temperatures and high pressures in a combustion chamber. When injected fuel is burned or partially burned in the combustion chamber, an effluent is discharged through a port at a lower end of the combustion chamber to a quench chamber disposed downstream of the combustion chamber. The quench chamber contains a liquid coolant such as water. The effluent from the combustion chamber is contacted with the liquid coolant in the quench chamber; so as to reduce the temperature of the effluent.

When the fuel is a solid such as coal or coke, the gasifier arrangement permits a solid portion of the effluent, in the form of ash, to be retained in the liquid pool of the quench chamber, and subsequently to be discharged as slag slurry. A gaseous component of the effluent is discharged from the quench chamber for further processing. The gaseous component, however, in passing through the quench chamber, will carry with it a substantial amount of the liquid coolant. A minimal amount of liquid entrained in the exiting gas is not considered objectionable to the overall process. However, excessive liquid carried from the quench chamber and into downstream equipment, is found to pose operational problems.

In conventional systems, a baffle is placed in the gas exiting path in the quench chamber. Consequently, as liquid-carrying gas contacts the baffle surfaces, a certain amount of the liquid will coalesce on the baffle surfaces. However, the rapidly flowing gas will re-entrain liquid droplets by sweeping droplets from the baffle's lower edge.

There is a need for an improved quench chamber assembly configured to cool an effluent gas from a combustion chamber and also remove entrained liquid content substantially from the effluent gas in a gasifier.

BRIEF DESCRIPTION

In accordance with one exemplary embodiment of the present invention, a gasifier includes a combustion chamber in which a combustible fuel is burned to produce a syngas and a particulated solid residue. A quench chamber having a liquid coolant is disposed downstream of the combustion chamber. A dip tube is disposed coupling the combustion chamber to the quench chamber. The syngas is directed from the combustion chamber to the quench chamber via the dip tube to contact the liquid coolant and produce a cooled syngas. An asymmetric or symmetric faceted baffle is disposed proximate to an exit path of the quench chamber. The cooled syngas is directed through between the dip tube and the quench chamber and impacted against the faceted baffle so as to remove entrained liquid content from the cooled syngas before the cooled syngas is directed through the exit path.

DRAWINGS

These and other features, aspects, and advantages of the present invention will become better understood when the following detailed description is read with reference to the accompanying drawings in which like characters represent like parts throughout the drawings, wherein.

Figure 9:
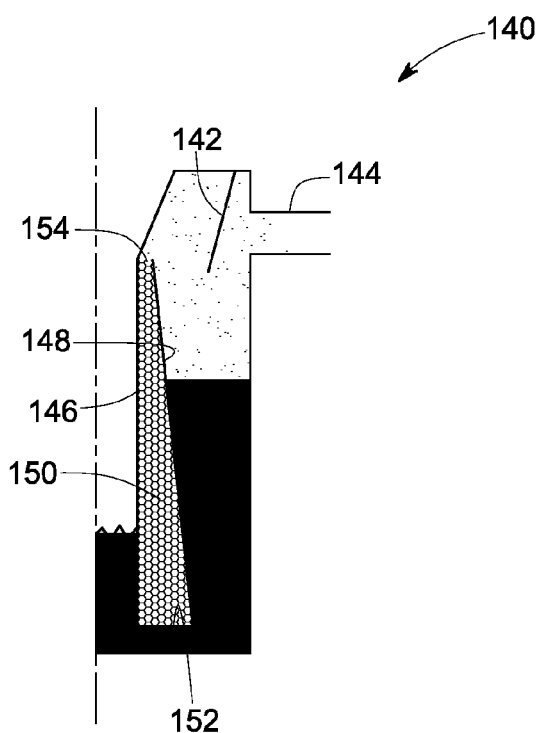
Figure 10:
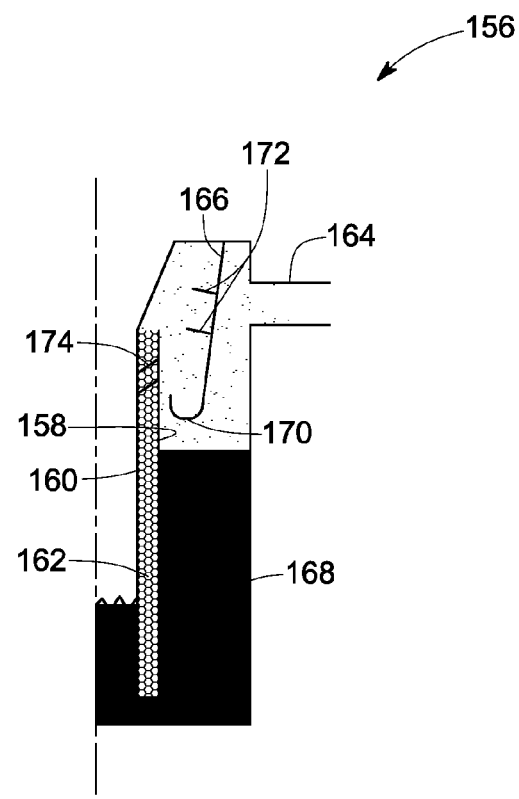
Figure 11:
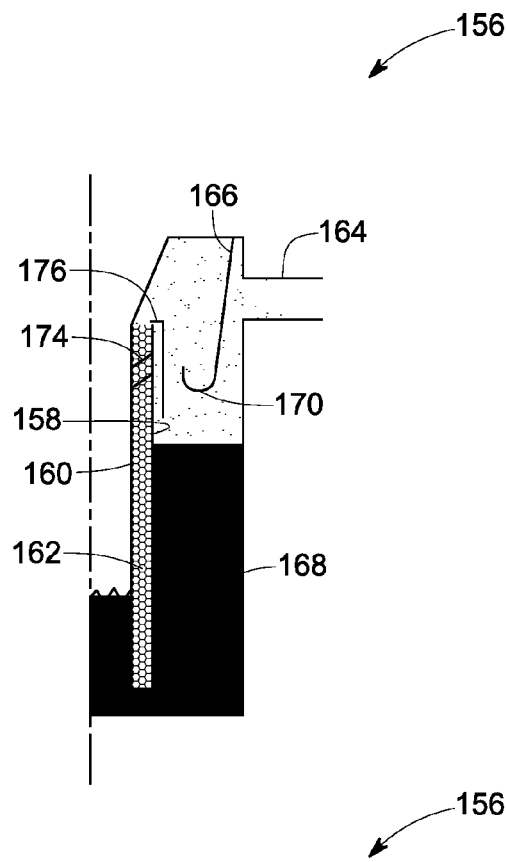
Figure 12:
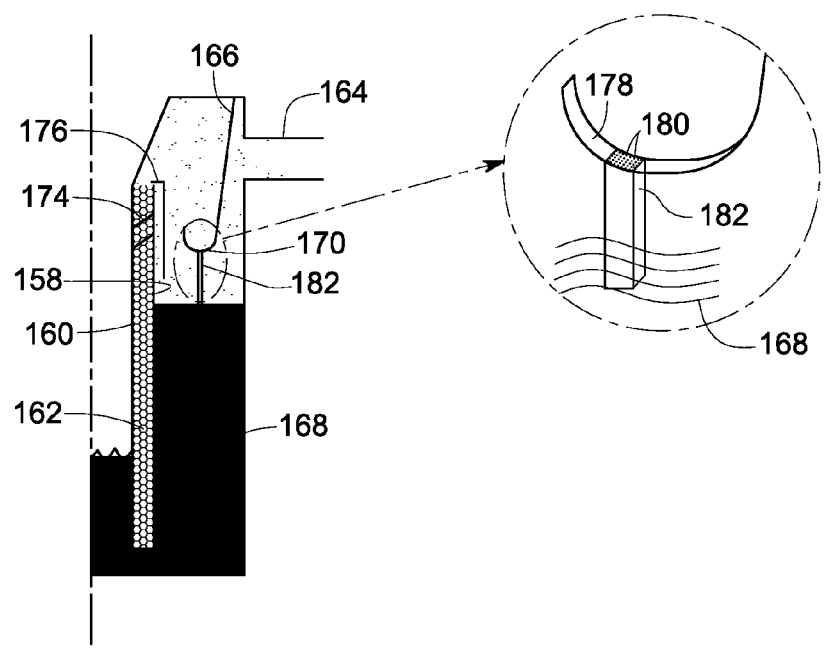
Figure 13:
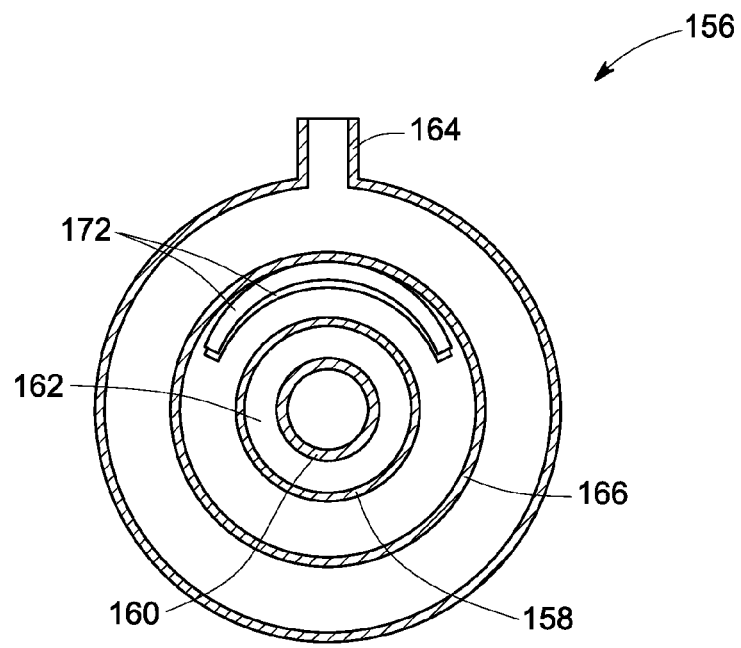
Figure 14:
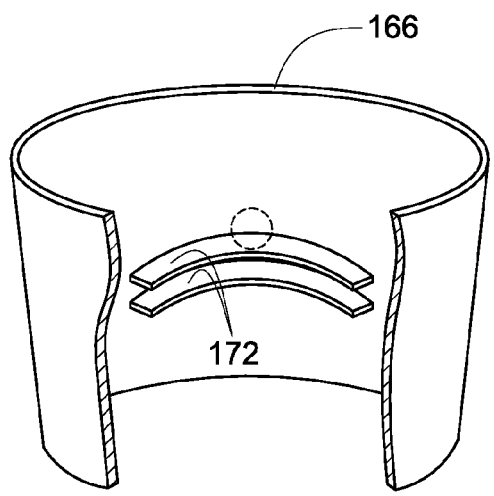
Figure 15:
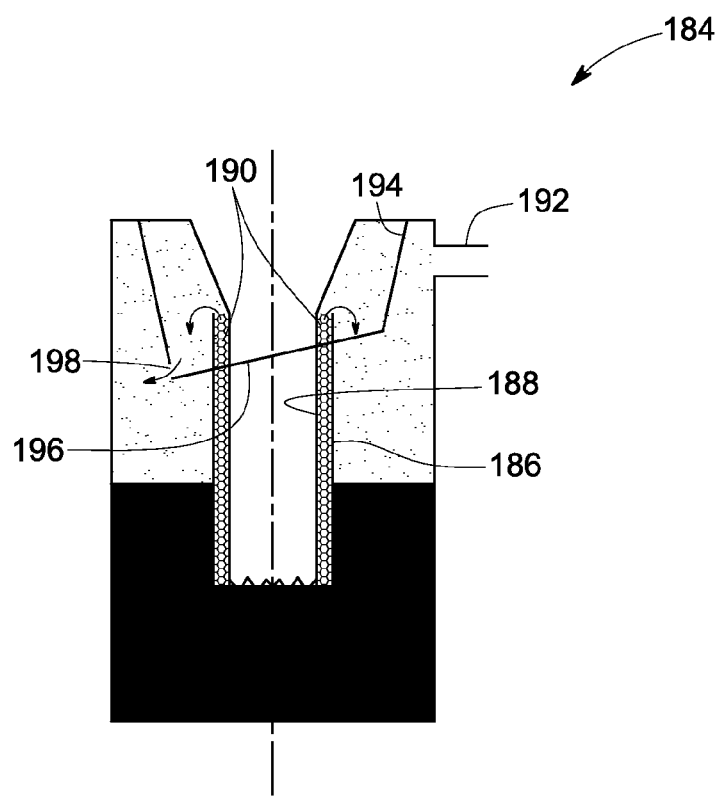
Figure 16:
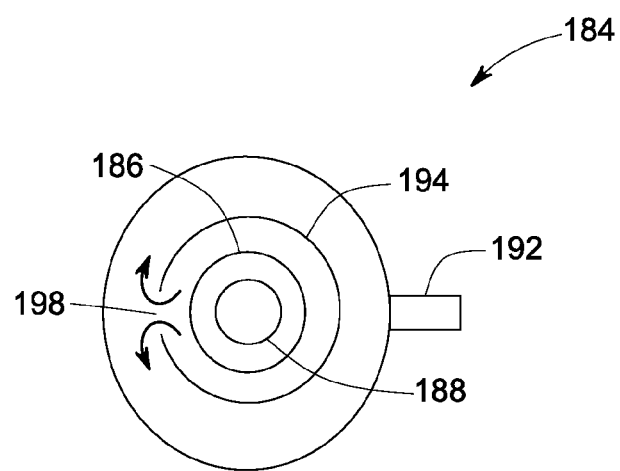
Figure 17:
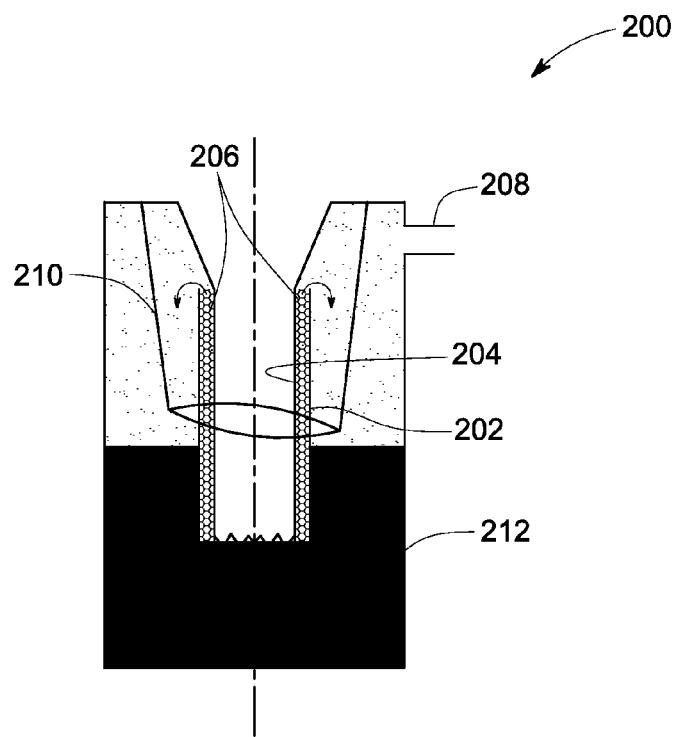
Figure 18:
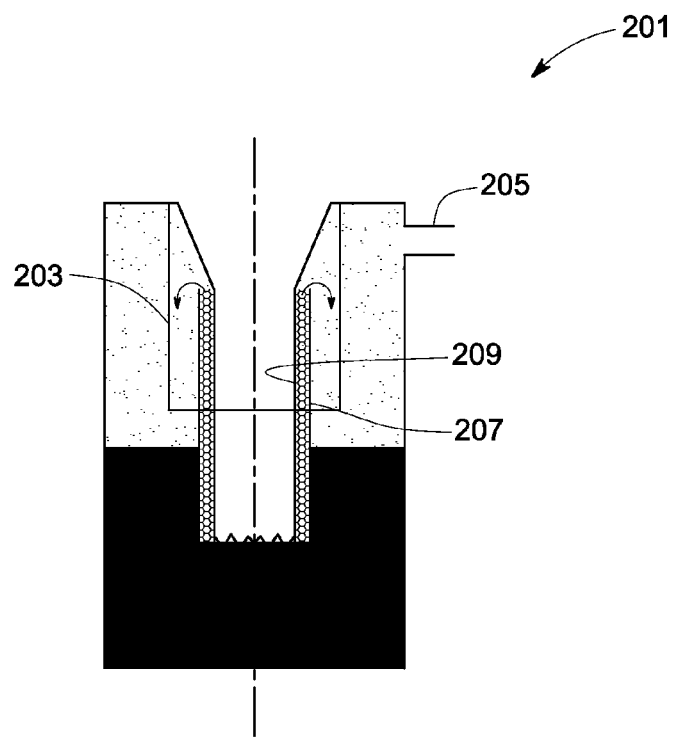
Figure 19:
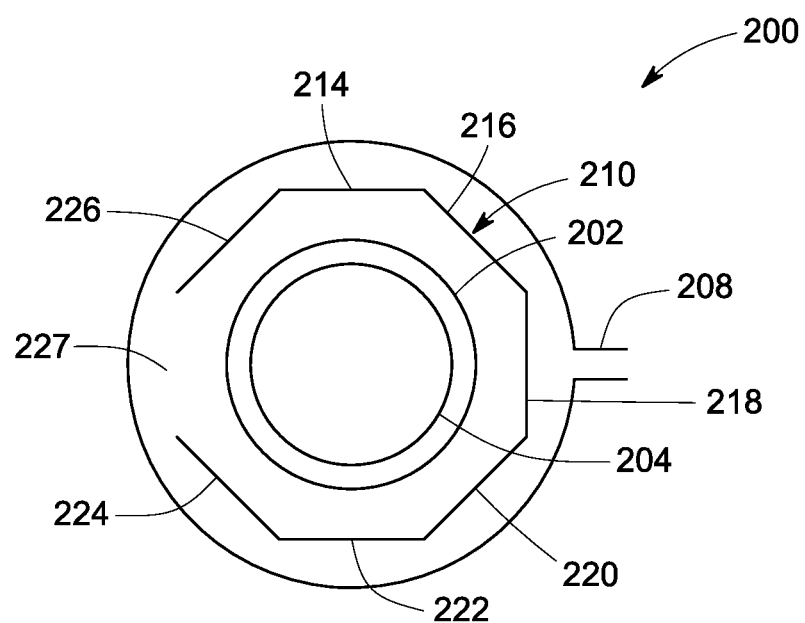
Figure 20:
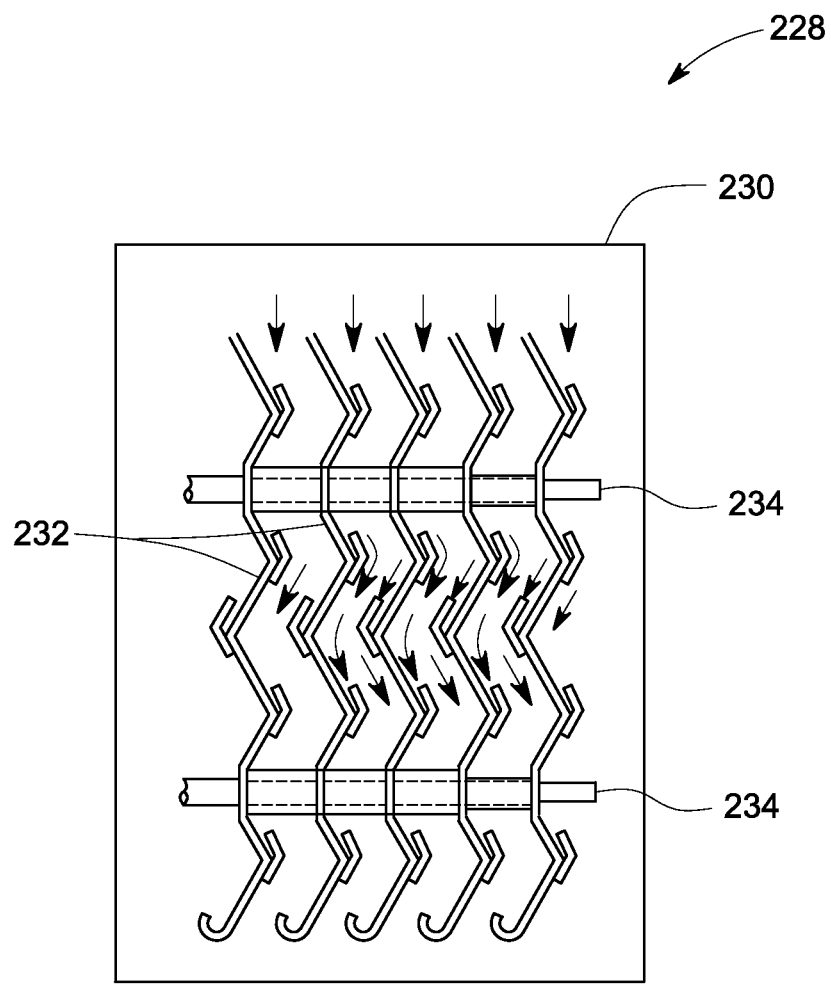
Figure 21:
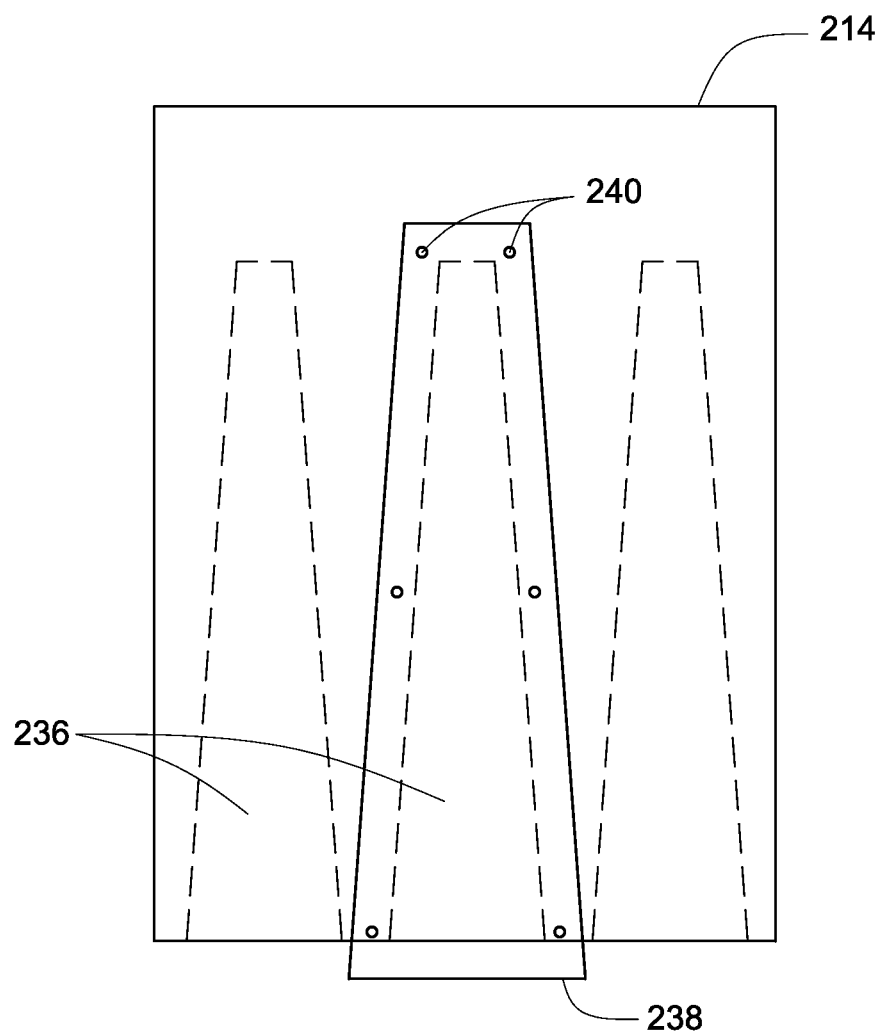
Figure 22:
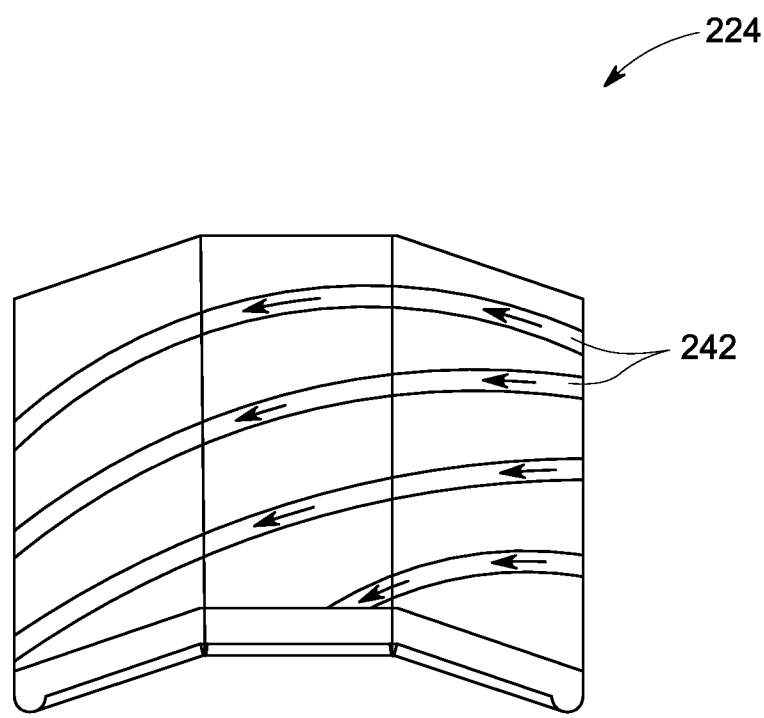
Figure 23:
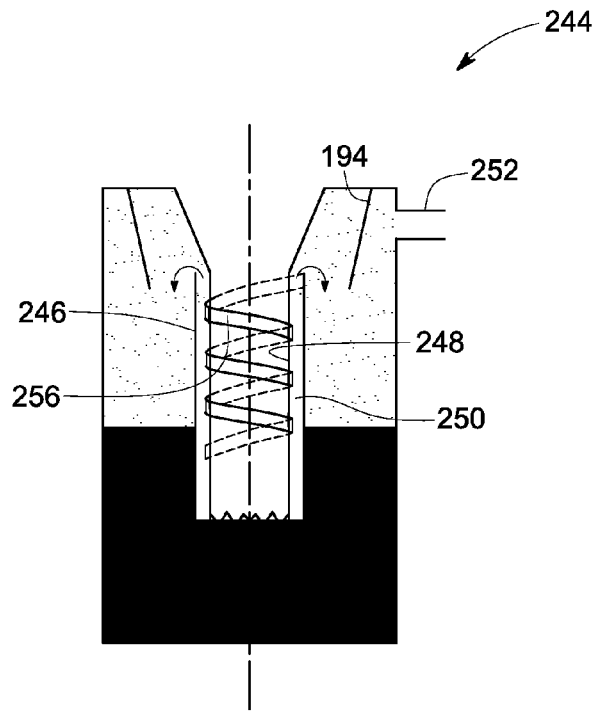
Figure 24:
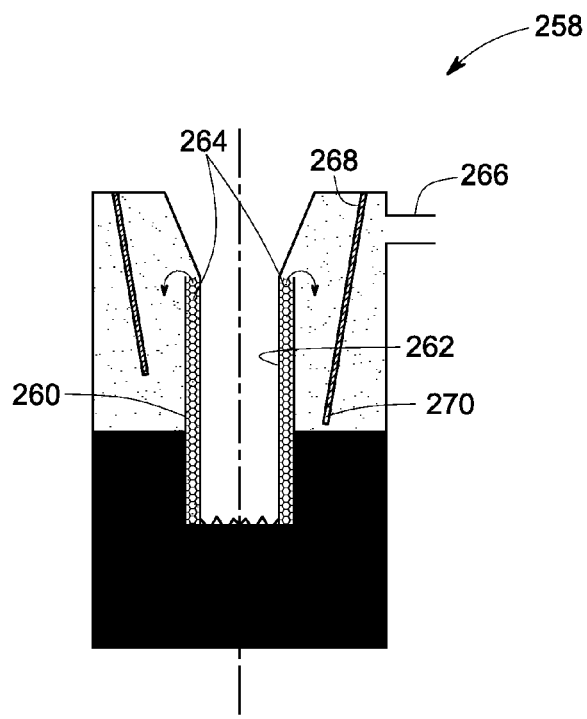
Figure 25:
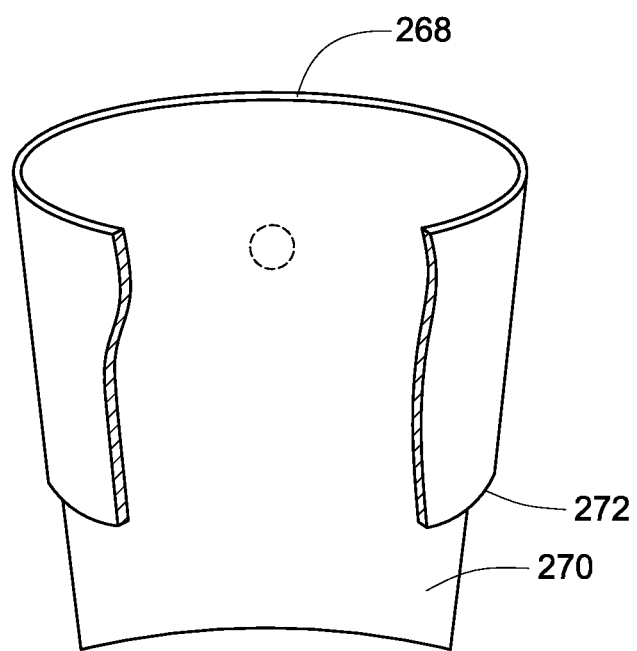

FIG. 9 is a diagrammatical representation of a portion of a quench chamber having an asymmetric or symmetric baffle and an annular passage having different cross-sectional areas disposed therein in accordance with an exemplary embodiment of the present invention; and FIG. 10 is a diagrammatical representation of a portion of a quench chamber having an asymmetric or symmetric baffle and a swirl generator disposed in an annular passage in accordance with an exemplary embodiment of the present invention;

FIG. 11 is a diagrammatical representation of a portion of a quench chamber having an asymmetric or symmetric baffle with a curved end, a swirl generator disposed in an annular passage, and a separator plate in accordance with an exemplary embodiment of the present invention;

FIG. 12 is a diagrammatical representation of a portion of a quench chamber having an asymmetric or symmetric baffle with a curved end to form a gutter and one or more openings coupled to a liquid guide pipe in accordance with an exemplary embodiment of the present invention;

FIG. 13 is a top view of a quench chamber in accordance with the embodiment illustrated in FIG. 12, FIG. 14 is a cutaway perspective view of a baffle illustrated in FIG. 13;

FIG. 15 is a diagrammatical representation of a portion of a quench chamber having an asymmetric or symmetric baffle having a closed bottom portion and an opening disposed opposite to a gas exit path in accordance with an exemplary embodiment of the present invention;

FIG. 16 is a top view of a portion of a quench chamber illustrated in FIG. 15;

FIG. 17 is a diagrammatical representation of a portion of a quench chamber having an asymmetric faceted or round baffle having an opening disposed opposite to a gas exit path and having an extended edge to provide a torturous path in accordance with the exemplary embodiments of the present invention;

FIG. 18 is a diagrammatical representation of a portion of a quench chamber having a symmetric faceted or round baffle in accordance with the exemplary embodiments of the present invention;

FIG. 19 is a top view of a portion of a quench chamber illustrated in FIG. 18;

FIG. 20 is a diagrammatical representation of a portion of a quench chamber having an asymmetric or symmetric faceted or round baffle having a mesh structure to capture entrained liquid in accordance with an exemplary embodiment of the present invention;

FIG. 21 is a diagrammatical representation of a portion of a quench chamber having an asymmetric or symmetric faceted or round baffle having a plurality of cut-out portions, metal pieces or plates disposed overlapping the cut-out portions with spacers disposed in-between to provide a torturous path for syngas flow in accordance with an exemplary embodiment of the present invention;

FIG. 22 is a diagrammatical representation of an asymmetric or symmetric faceted or round baffle spiral "gussets" disposed to guide the entrained liquid content in accordance with an exemplary embodiment of the present invention;

FIG. 23 is a diagrammatical representation of a quench chamber employing a helical baffle in the annular passage between a dip tube and a draft tube in accordance with an exemplary embodiment of the present invention;

FIG. 24 is a diagrammatical representation of a quench chamber employing an asymmetric or symmetric baffle having an extended portion near exit in accordance with an exemplary embodiment of the present invention; and FIG. 25 is a cutaway perspective view of a baffle illustrated in FIG. 24.

DETAILED DESCRIPTION

In accordance with the exemplary embodiments disclosed herein, a gasifier having a quench chamber assembly configured to reduce temperature of syngas downstream of a combustion chamber is disclosed. The gasifier includes a quench chamber containing a liquid coolant disposed downstream of the combustion chamber. A syngas generated from the combustion chamber is directed via a dip tube to the quench chamber to contact the liquid coolant and produce a cooled syngas. A baffle is disposed proximate to an exit path of the quench chamber. The baffle may be a symmetric or asymmetric shaped baffle. A draft tube is disposed surrounding the dip tube such that an annular passage is formed between the draft tube and the dip tube. The cooled syngas is directed through the annular passage and impacted against the baffle so as to remove entrained liquid content from the cooled syngas before the cooled syngas is directed through the exit path. In some embodiments, a deflector plate is disposed between the liquid coolant and the exit path of the quench chamber and configured to remove entrained liquid content from the cooled syngas and prevent sloshing of liquid content to the exit path. In yet another embodiment, a swirl generator is disposed in the annular passage between the dip tube and the draft tube and configured to induce a swirling motion to the cooled syngas directed through the annular passage. In some embodiments embodiments, the baffle is asymmetric or symmetric, either open or angular, to remove entrained liquid content from the cooled syngas. In other embodiments, the baffle itself can have channels or cut-outs and overlays to remove entrained liquid and prevent sloshing of liquid content to the exit path. In other embodiments only dip tube is present and the annular section is formed between the dip tube and the quench chamber wall. The provision of asymmetric or symmetric shaped baffle, deflector plate, swirl generator, or combinations thereof substantially reduces entrainment of liquid content in the syngas directed through the exit path to the downstream components. Specific embodiments are discussed in greater detail below with reference to FIGS. 1-25.

Figure 1:
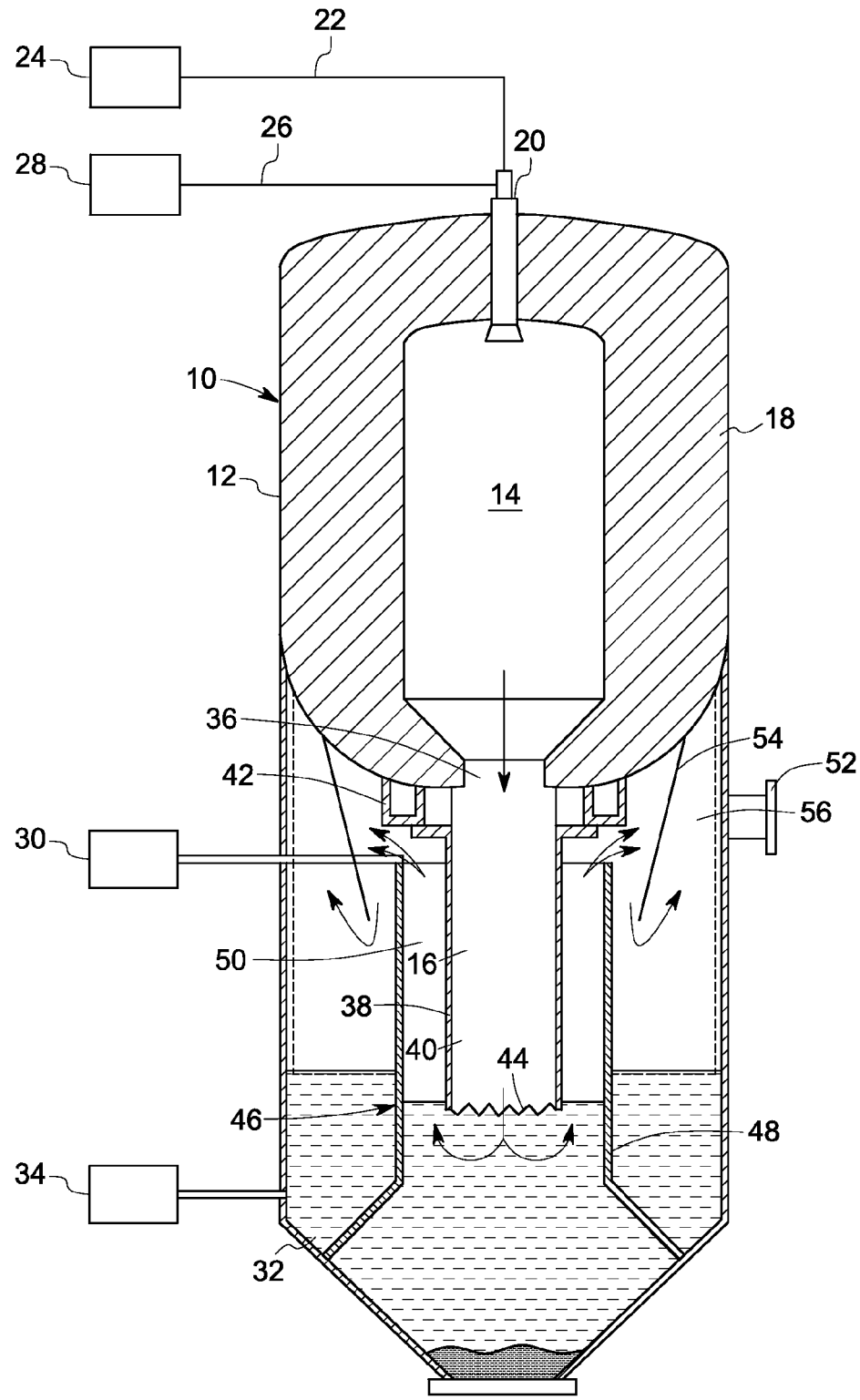
FIG. 1 is a diagrammatical representation of a gasifier having an exemplary quench chamber in accordance with an exemplary embodiment of the present invention.

Referring to FIG. 1, an exemplary gasifier 10 is disclosed. The gasifier 10 includes an outer shell 12 housing a combustion chamber 14 at an upper end and a quench chamber 16 at a lower end. Combustion chamber 14 is provided with a refractory wall 18 capable of withstanding the normal operating temperatures. A burner 20 is coupled via a path 22 to a fuel source 24. A fuel stream including pulverized carbonaceous fuel such as coal, coke or the like, is fed into the combustion chamber 12 via the burner 20 removably disposed on an upper wall of the combustion chamber 14. The burner 20 is further coupled via a path 26 to a combustion supporting gas source 28 configured to supply gas such as oxygen or air.

The combustible fuel is burned in the combustion chamber 14 to produce an effluent including syngas and a particulated solid residue. Hot effluent is fed from the combustion chamber 14 to the quench chamber 16 provided at the lower end of the shell 12. The quench chamber 16 is coupled to a pressurized source 30 and configured to supply a pool of liquid coolant 32, preferably water to the quench chamber 16. The level of the liquid coolant in the quench chamber pool 16 is maintained at a desired height to assure an efficient operation depending on the conditions of the effluent fed from the combustion chamber 14 into the quench chamber 16. The lower end of the gasifier shell 12 is provided with a discharge port 34 through which water and fine particulates are removed from quench chamber 16 in the form of a slurry.

In the illustrated embodiment, a constricted portion 36 of the combustion chamber 14 is coupled to the quench chamber 16 via a dip tube 38. The hot effluent is fed from the combustion chamber 14 to the liquid coolant 32 in the quench chamber 16 via a passageway 40 of the dip tube 38. A quench ring 42 is disposed proximate to the dip tube 38 and coupled to the pressurized source 30 so as to sustain a dip tube inner wall in a wetted condition to best accommodate the downward effluent flow. A lower end 44 of the dip tube 38 may be serrated, and positioned below the surface of the liquid coolant 32 to efficiently achieve cooling of the effluent.

A draft tube 46 is positioned in the quench chamber 16. The draft tube 46 includes an elongated cylindrical body 48 fixedly supported in the gasifier shell 12. A lower portion of the draft tube 46 is submerged in the liquid coolant 32. The cylindrical body 48 terminates adjacent to, but spaced at its upper end, from the quench ring 42. The cylindrical body 48 is also spaced from the dip tube 38 to define an annular passage 50. The syngas is contacted with the liquid coolant 32 to produce a cooled syngas. The cooled syngas is then passed through the annular passage 50 towards an exit path 52 of the quench chamber 16.

As discussed above, the gaseous component of the effluent is discharged for further processing via the exit path 52 from the quench chamber 16. It is known conventionally that the gaseous component, however, in passing through a quench chamber, will carry with it a substantial amount of the liquid coolant. Excessive liquid carried from the quench chamber and into downstream equipment, is found to pose operational problems. In the illustrated exemplary embodiment, an asymmetric or symmetric shaped baffle 54 is disposed proximate to the exit path 52 in the quench chamber 16. The baffle 54 extends a distance below an upper edge of the draft tube 46, but above the surface of liquid coolant 32. The cooled syngas directed through the annular passage 50 is impacted against an inner wall of the baffle 54. In the normal course of quench cooling, the cooled gas stream would convey with it a certain amount of liquid coolant. However, as the cooled gas stream impinges against the inner surface of baffle 54, the entrained liquid content in the gas stream will tend to coalesce on the inner surface of the baffle 54. The gas stream after impacting the baffle 54 reverses direction and then moves along a path 56 into the exit path 52. It should be noted herein that the illustrated gasifier is an exemplary embodiment and other configurations of gasifiers are also envisaged. For example, in some embodiments, the exemplary quench chamber 16 may be disposed beneath a radiant syngas cooler configured to partially reduce the syngas temperature before syngas enters the quench chamber. The details of the quench chamber 16 are discussed in greater detail below with reference to subsequent figures.

Figure 2:
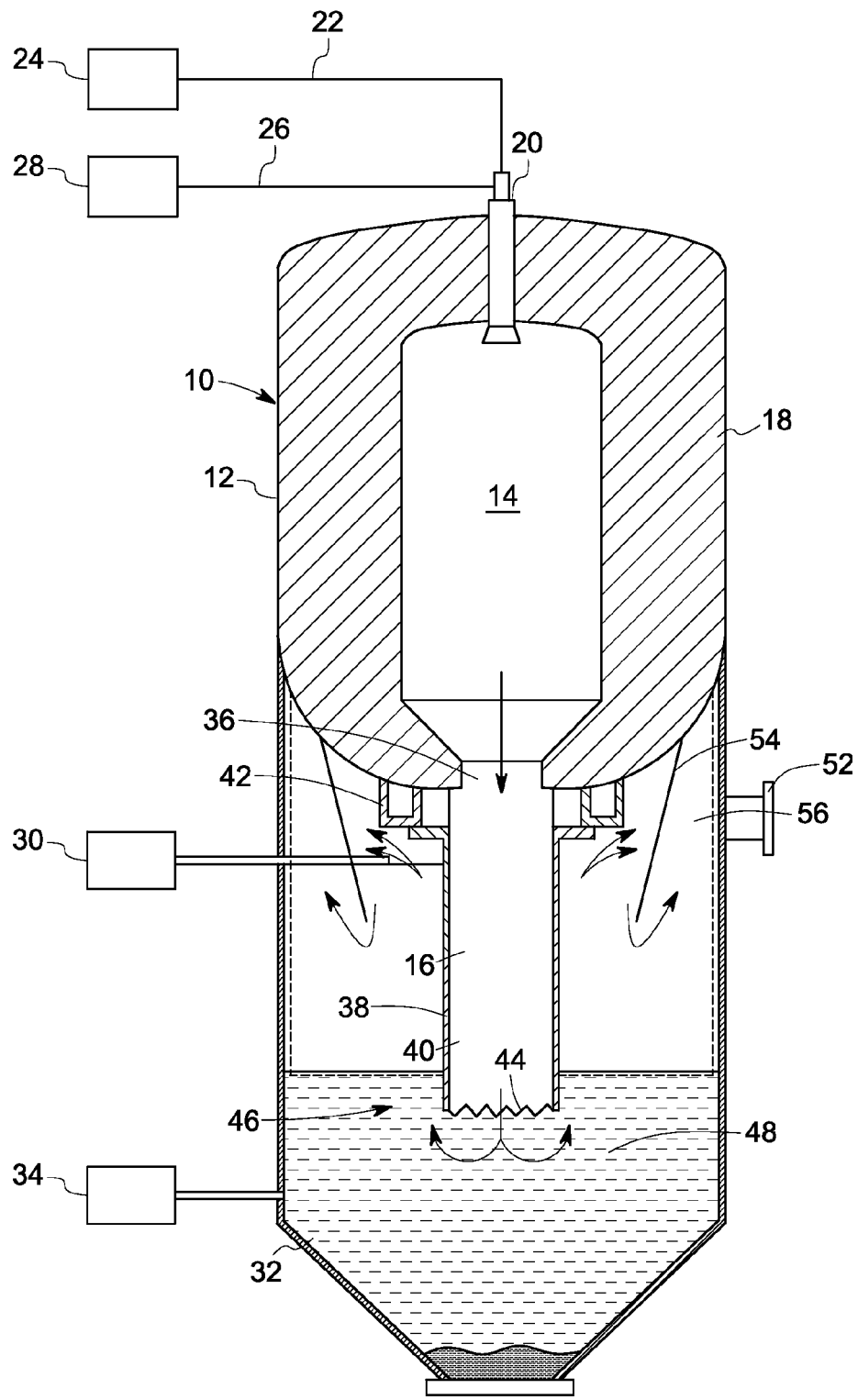
FIG. 2 is a diagrammatical representation of a gasifier having an exemplary quench chamber with only dip tube in accordance with an exemplary embodiment of the present invention.

Referring to FIG. 2, an exemplary gasifier 10 is disclosed. The gasifier 10 is similar to the embodiment illustrated in FIG. 1. As discussed above, the hot effluent is fed from the combustion chamber 14 to the liquid coolant 32 in the quench chamber 16 via the passageway 40 of the dip tube 38. The lower end 44 of the dip tube 38 may be serrated, and positioned below the surface of the liquid coolant 32 to efficiently achieve cooling of the effluent. It should be noted herein that in the illustrated embodiment, there is no draft tube. The syngas is contacted with the liquid coolant 32 to produce a cooled syngas. The cooled syngas is impacted against an inner wall of the baffle 54. As the cooled gas stream impinges against the inner surface of baffle 54, the entrained liquid content in the gas stream will tend to coalesce on the inner surface of the baffle 54. The cooled syngas is then passed towards the exit path 52 of the quench chamber 16.

Figure 3:
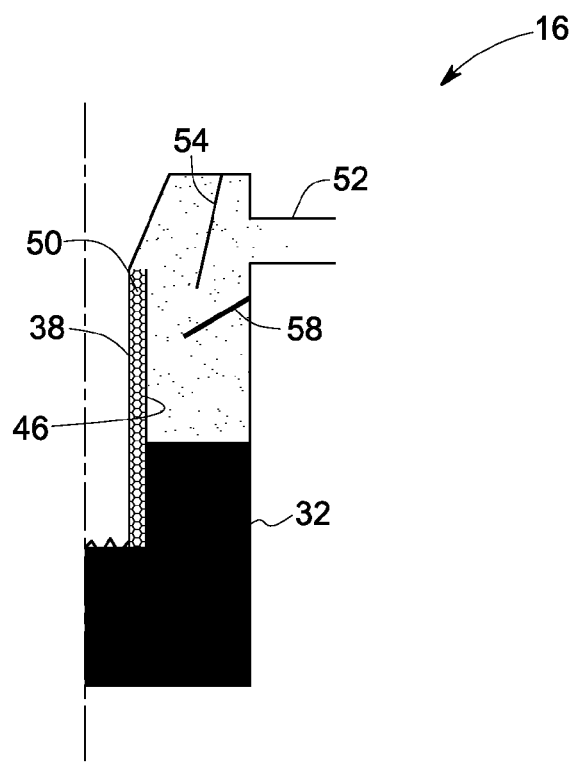
FIG. 3 is a diagrammatical representation of a portion of a quench chamber having an asymmetric or symmetric baffle and a deflector plate disposed therein in accordance with an exemplary embodiment of the present invention.

Referring to FIG. 3, a portion of the quench chamber 16 is disclosed. As discussed above, the draft tube 46 is positioned surrounding the dip tube 38 in the quench chamber 16. The syngas is contacted with the liquid coolant 32 to produce a cooled syngas. The cooled syngas is then passed through the annular passage 50 between the dip tube 38 and the draft tube 46 towards the exit path 52 of the quench chamber 16. In addition to the asymmetric or symmetric shaped baffle 54, a deflector plate 58 is also disposed between the liquid coolant 32 and the exit path 52. It should be noted herein that the deflector plate 58 may be disposed at a predetermined angle with respect to the liquid coolant 32.

Also as discussed previously, the cooled syngas directed through the annular passage 50 is impacted against an inner wall of the baffle 54. As the cooled gas stream impinges against the inner surface of baffle 54, the entrained liquid content in the gas stream will tend to coalesce on the inner surface of the baffle 54. In the illustrated embodiment, in addition to the asymmetric or symmetric baffle 54, the cooled syngas is also impacted against the deflector plate 58 so as to remove additional entrained liquid coolant content from the cooled syngas before being directed through the exit path. In other words, the deflector plate 58 provides an additional barrier for removing entrained liquid content from the cooled syngas fed from the quench chamber 16. Also, the deflector plate 58 prevents sloshing of liquid coolant 32 to the exit path 52 of the quench chamber 16.

Figure 4:
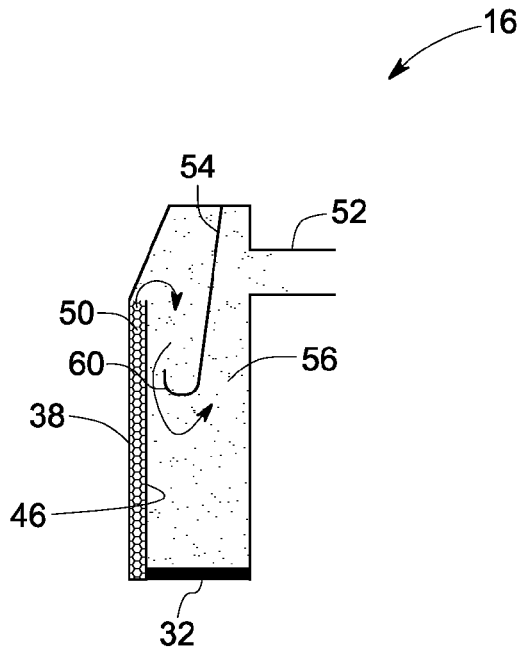
FIG. 4 is a diagrammatical representation of a portion of a quench chamber having an asymmetric or symmetric baffle with a curved end to form a gutter in accordance with an exemplary embodiment of the present invention.

Referring to FIG. 4, a portion of the quench chamber 16 is disclosed. In the illustrated embodiment, the baffle 54 is disposed proximate to the exit path 52 in the quench chamber 16. The baffle 54 extends a distance below an upper edge of the draft tube 46, but above the surface of liquid coolant 32. As noted above, the cooled syngas directed through the annular passage 50 is impacted against an inner wall of the baffle 54. It should be noted herein that in the illustrated embodiment, the baffle 54 is an asymmetric shaped baffle. In another embodiment, the baffle 54 may be a symmetric baffle. In the illustrated embodiment, the asymmetric baffle 54 includes a curved end portion 60 pointed towards the liquid coolant 32. As the cooled gas stream impinges against the inner surface of the baffle 54, the entrained liquid content in the gas stream will tend to coalesce on the inner surface of the baffle 54. The gas stream after impacting the baffle 54 reverses direction and then moves along a path 56 into the exit path 52. The asymmetric shape of the baffle 54 prevents the rapidly flowing gas from re-entrain liquid droplets by sweeping droplets from a baffle's lower edge.

Figure 5:
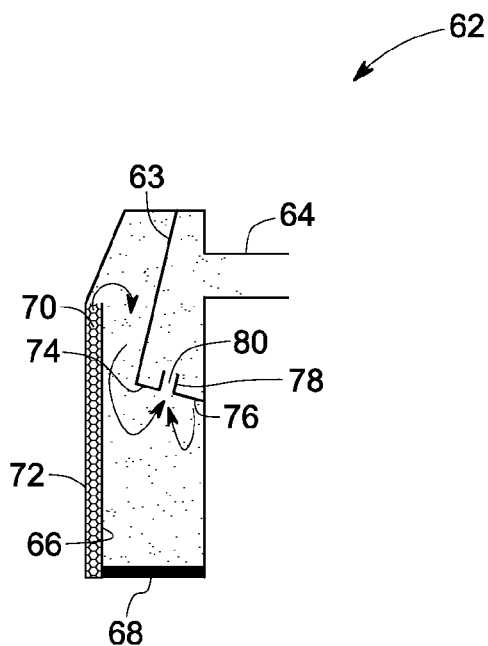
FIG. 5 is a diagrammatical representation of a portion of a quench chamber having an asymmetric or symmetric baffle and a deflector plate disposed therein in accordance with an exemplary embodiment of the present invention.

Referring to FIG. 5, a portion of a quench chamber 62 is disclosed. In the illustrated embodiment, a baffle 63 is disposed proximate to an exit path 64 in the quench chamber 62. In the illustrated embodiment, the baffle 63 is an asymmetric baffle. In another embodiment, the baffle 63 is a symmetric baffle. The baffle 63 extends a distance below an upper edge of a draft tube 66, but above the surface of a liquid coolant 68. As noted above, the cooled syngas directed through an annular passage 70 formed between a dip tube 72 and the draft tube 66 is impacted against an inner wall of the baffle 63. In the illustrated embodiment, the baffle 63 includes a deflected end portion 74 pointed towards the liquid coolant 68. As the cooled gas stream impinges against an inner surface of the baffle 63, the entrained liquid content in the gas stream will tend to coalesce on the inner surface of the baffle 63.

In addition to the baffle 63, a deflector plate 76 is also disposed between the liquid coolant 68 and the exit path 64. It should be noted herein that the deflector plate 76 is disposed at a predetermined angle pointed away from the liquid coolant 68. In the illustrated embodiment, the deflector plate 76 is an asymmetric or symmetric shaped deflector plate having a deflected end portion 78. In addition to the baffle 63, the cooled syngas is also impacted against the deflector plate 76 so as to remove additional entrained liquid coolant content from the cooled syngas. Also, the deflector plate 76 prevents sloshing of liquid coolant 68 to the exit path 64 of the quench chamber 62. The cooled syngas after impacting the baffle 63 and the deflector plate 76 is then directed through a gap 80 between the deflected end portions 74, 78 to the exit path 64 of the quench chamber 62.

Figure 6:
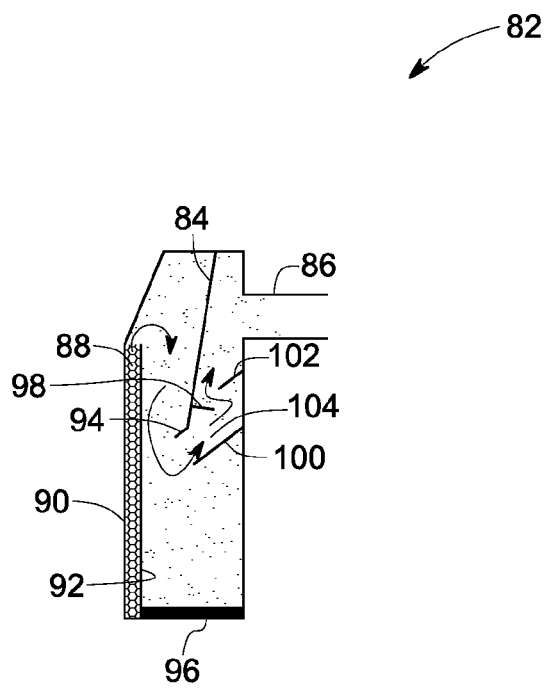
FIG. 6 is a diagrammatical representation of a portion of a quench chamber having an asymmetric or symmetric baffle and a plurality of deflector plates disposed therein in accordance with an exemplary embodiment of the present invention.

Referring to FIG. 6, a portion of a quench chamber 82 is disclosed. In the illustrated embodiment, a baffle 84 is disposed proximate to an exit path 86 in the quench chamber 82. In the illustrated embodiment, the baffle 84 is an asymmetric baffle. In another embodiment, the baffle 84 may be a symmetric baffle. The cooled syngas is directed through an annular passage 88 formed between a dip tube 90 and a draft tube 92 and impacted against an inner wall of the baffle 84. In the illustrated embodiment, the baffle 84 includes a deflected end portion 94 pointed towards a liquid coolant 96 contained in the quench chamber 82. The baffle 84 may also include at least one gusset 98. As the cooled gas stream impinges against an inner surface of the baffle 84, the entrained liquid content in the gas stream will tend to coalesce on the inner surface of the baffle 84. The gusset 98 facilitates to drain the liquid coolant collected on the surface of the baffle 84.

In the illustrated embodiment, a plurality of deflector plates 100, 102 are disposed between the liquid coolant 96 and the exit path 86. It should be noted herein that the deflector plates 100, 102 are disposed at a predetermined angle pointing towards the liquid coolant 96. The cooled syngas is impacted against the baffle 84 and the deflector plates 100, 102 so as to remove additional entrained liquid coolant content from the cooled syngas. The deflector plates 100, 102 prevent sloshing of liquid coolant 96 to the exit path 86 of the quench chamber 82. The cooled syngas is impacted against the baffle 84 and the deflector plates 100, 102 and then directed through a gap 104 between the baffle 84 and the deflector plates 100, 102 to the exit path 86 of the quench chamber 82.

Figure 7:
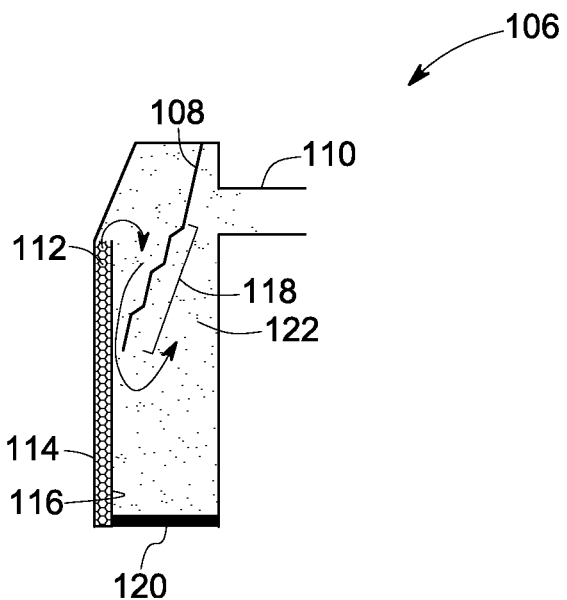
FIG. 7 is a diagrammatical representation of a portion of a quench chamber having an asymmetric or symmetric baffle disposed therein in accordance with an exemplary embodiment of the present invention.

Referring to FIG. 7, a portion of a quench chamber 106 is disclosed. In the illustrated embodiment, a baffle 108 is disposed proximate to an exit path 110 in the quench chamber 106. In the illustrated embodiment, the baffle 108 is an asymmetric baffle. In another embodiment, the baffle 108 is a symmetric baffle. The cooled syngas is directed through an annular passage 112 formed between a dip tube 114 and a draft tube 116 and impacted against an inner wall of the baffle 108. In the illustrated embodiment, the baffle 108 includes a stepped portion 118 pointed towards a liquid coolant 120 contained in the quench chamber 106. As the cooled gas stream impinges against an inner surface of the baffle 108, the entrained liquid content in the gas stream will tend to coalesce on the inner surface of the baffle 108. The cooled syngas after impacting the baffle 108 is then redirected through a path 122 to the exit path 110 of the quench chamber 106.

In accordance with the embodiments discussed herein, the provision of the baffle, deflector plate, or combinations there of facilitates to reduce cooled syngas flow velocity, and also to increase gas flow path distance between the liquid coolant and the exit path of the quench chamber. This results in increased residence time of the gas and liquid coolant mixture in the quench chamber leading to enhanced removal of entrained liquid content from the cooled syngas.

Figure 8:
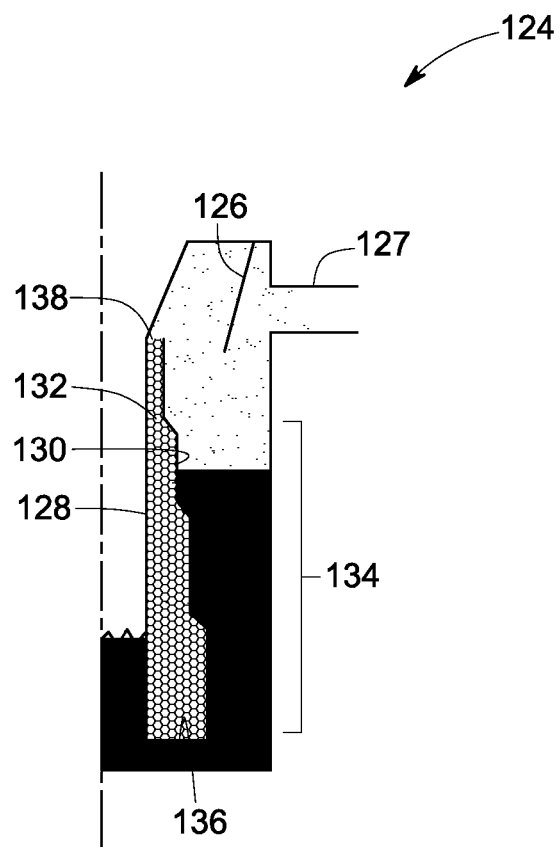
FIG. 8 is a diagrammatical representation of a portion of a quench chamber having an asymmetric or symmetric baffle and an annular passage having different cross-sectional areas disposed therein in accordance with an exemplary embodiment of the present invention.

Referring to FIG. 8, a portion of a quench chamber 124 is disclosed. In the illustrated embodiment, baffle 126 is disposed proximate to an exit path 127 in the quench chamber 124. The baffle 126 may be a symmetric or an asymmetric baffle. As noted in the previous embodiments, hot effluent is directed from a combustion chamber to the quench chamber 124 via a dip tube 128. A draft tube 130 is disposed surrounding the dip tube 128 such that an annular passage 132 is formed between the dip tube 128 and the draft tube 130. The cooled syngas is directed through an annular passage 132 formed between the dip tube 128 and the draft tube 130 and impacted against an inner wall of the baffle 126 so as to remove additional entrained liquid coolant content from the cooled syngas.

In the illustrated embodiment the draft tube 130 includes a stepped portion 134. In other words, the annular passage 132 formed between the dip tube 128 and the draft tube 130 has different cross-sectional areas. The cross-sectional area of the annular passage 132 decreases from one end 136 to another end 138. This reduces any plugging at the end 136.

Referring to FIG. 9, a portion of a quench chamber 140 is disclosed. In the illustrated embodiment, a baffle 142 is disposed proximate to an exit path 144 in the quench chamber 140. The baffle 142 may be a symmetric or an asymmetric baffle. As noted in the previous embodiments, hot effluent is directed from a combustion chamber to the quench chamber 140 via a dip tube 146. A draft tube 148 is disposed surrounding the dip tube 146 such that an annular passage 150 is formed between the dip tube 146 and the draft tube 148. The cooled syngas is directed through an annular passage 150 formed between the dip tube 146 and the draft tube 148 and impacted against an inner wall of the baffle 142 so as to remove additional entrained liquid coolant content from the cooled syngas.

In the illustrated embodiment the draft tube 148 has varying cross-sectional area. In other words, the annular passage 150 formed between the dip tube 146 and the draft tube 148 has different cross-sectional areas. The cross-sectional area of the annular passage 150 decreases from one end 152 to another end 154.

In accordance with the embodiments discussed with reference to FIGS. 8-9, an annular passage having different cross-sectional areas facilitate to reduce syngas speed fed through the annular passage. In addition, this also increases the cross-sectional area between the draft tube 148 and the quench vessel inner wall. This results in enhanced removal of entrained liquid content from the cooled syngas.

Referring to FIG. 10, a portion of a quench chamber 156 is disclosed. In the illustrated embodiment, a draft tube 158 is positioned surrounding a dip tube 160 in the quench chamber 156. The cooled syngas is passed through the annular passage 162 formed between the dip tube 160 and the draft tube 158 towards an exit path 164 of the quench chamber 156. A baffle 166 is disposed proximate to the exit path 164 in the quench chamber 156. In the illustrated embodiment, the baffle 166 is an asymmetric baffle. In another embodiment, the baffle 166 is a symmetric baffle. The baffle 166 extends a distance below an upper edge of the draft tube 158, but above the surface of liquid coolant 168 filled in the quench chamber 156. The baffle 166 includes a curved end portion 170, and a plurality of gussets 172. An inner surface of the baffle may be made sticky.

The cooled syngas is directed through the annular passage 162 and impacted against an inner wall of the baffle 166. In the illustrated embodiment, a rotary device, for example a swirl generator 174 is disposed in the annular passage 162 and configured to induce swirling motion to the cooled syngas passed through the annular passage 162. As the cooled gas stream impinges against the inner surface of baffle 166, the imparted swirling motion facilitates the entrained liquid content in the gas stream to coalesce on the inner surface of the baffle 166. In other words, the swirling motion imparts higher centrifugal force and thus generates higher droplet diameter of the entrained liquid. The gussets 172 of the baffle 166 facilitate to drain the liquid content removed by the baffle 166.

Referring to FIG. 11, a portion of the quench chamber 156 is disclosed. This embodiment is similar to the embodiment illustrated in FIG. 10. Additionally, a separator plate 176 is disposed between the draft tube 158 and the baffle 166. The swirl generator 174 is disposed in the annular passage 162 and configured to induce swirling motion to the cooled syngas passed through the annular passage 162. This results in forming a entrained liquid film on an inner wall of the draft tube 158 and the resulting liquid film is directed downward using the separator plate 176.

Referring to FIG. 12, a portion of the quench chamber 156 is disclosed. This embodiment is similar to the embodiment illustrated in FIG. 10. The baffle 166 includes the curved end portion 170 having a slope portion 178 and a plurality of holes 180 to provide an exit path for entrained liquid content collected on the curved end portion 170. The collected liquid content drained through the holes 180 is guided downwards through a guide pipe 182 coupled the curved end portion 170. An end of the water guide pipe 182 may be partially dipped in the liquid coolant in the quench chamber 156.

Referring to FIG. 13, a portion of the quench chamber 156 is disclosed. This embodiment is similar to the embodiment illustrated in FIG. 12. The baffle 166 includes the plurality of gussets 172 disposed proximate to the exit path 164. One or more gussets 172 may be disposed on an inner circumference of the baffle 166. The gussets 172 may be circumferentially aligned with the exit path 166 and may have a curvature extending along a portion of the inner circumference of the baffle 166. According to certain embodiments, the gussets 172 may extend approximately along one third of the inner circumference of the baffle 166. Specifically, the gussets 172 may be designed to contact the increased velocity syngas and direct flow of entrained liquid content collected on the baffle 166 away from the exit path 164. For example, the gussets 172 may impede droplets of the liquid content from becoming entrained in the higher velocity syngas directed towards the exit path 164. The gussets 172 may also promote coalescence of the entrained liquid content.

Referring to FIG. 14, a portion of the baffle 166 is disclosed. As discussed previously, one or more gussets 172 may be disposed on the inner circumference of the baffle 166. According to certain embodiments, the gussets 172 may extend approximately along one third of the inner circumference of the baffle 166. In the illustrated embodiment, the gussets 172 may be angled downward in the quench chamber to direct the entrained liquid content away from the exit path of the quench chamber.

Referring to FIG. 15, a quench chamber 184 is disclosed. In the illustrated embodiment, a draft tube 186 is positioned surrounding a dip tube 188 in the quench chamber 184. The cooled syngas is passed through the annular passage 190 formed between the dip tube 188 and the draft tube 186 towards an exit path 192 of the quench chamber 184. A faceted or round baffle 194 is disposed proximate to the exit path 192 in the quench chamber 184. In one embodiment, the baffle 194 is an asymmetric baffle. In another embodiment, the baffle 194 is a symmetric baffle. A bottom 196 of the baffle 194 is closed such that an area between the baffle bottom 196 and draft tube 186 is blocked using an annular plate. The baffle 194 has an opening 198 disposed opposite to the exit path 192 such that the syngas flows along a torturous path.

Referring to FIG. 16, a top view of the quench chamber 184 is illustrated. As discussed previously, the baffle 194 is disposed proximate to the exit path 192 in the quench chamber 184. The baffle 194 has an opening 198 disposed opposite to the exit path 192 such that the syngas flows along a torturous path.

Referring to FIG. 17, a quench chamber 200 is disclosed. In the illustrated embodiment, a draft tube 202 is positioned surrounding a dip tube 204 in the quench chamber 200. The cooled syngas is passed through the annular passage 206 formed between the dip tube 204 and the draft tube 202 towards an exit path 208 of the quench chamber 200. A faceted or round baffle 210 is disposed proximate to the exit path 208 and surrounding the dip tube 204 and the draft tube 202 in the quench chamber 200. The syngas is cooled by contacting a liquid coolant 212 in the quench chamber 200.

Referring to FIG. 18, a quench chamber 201 is disclosed. In the illustrated embodiment, a symmetric baffle 203 is disposed proximate to an exit path 205 and surrounding a dip tube 207 and a draft tube 209 in the quench chamber 201.

Referring to FIG. 19, a quench chamber 200 is disclosed. This embodiment is same as the embodiment illustrated in FIG. 17. In the illustrated embodiment, the draft tube 202 is positioned surrounding the dip tube 204 in the quench chamber 200. The cooled syngas is passed through the annular passage 206 formed between the dip tube 204 and the draft tube 202 towards the exit path 208 of the quench chamber 200. A baffle 210 is disposed proximate to the exit path 208 and surrounding the dip tube 204 and the draft tube 202 in the quench chamber 200. In the illustrated embodiment, the baffle 210 is a faceted baffle. The illustrated baffle 210 includes a plurality of splash plates 214, 216, 218, 220, 222, 224, 226. The baffle 210 has an opening 227 opposite to the exit path 208. In another embodiment, the plates 224 and 226 may also be removed so that the baffle 210 has a larger opening that will further decrease the syngas flow velocity and facilitate removal of entrained liquid content from the syngas. The baffle 210 has a shorter edge opposite to the exit path 208. A side of the baffle proximate to the exit path 208 extends down towards a liquid coolant 212 to provide a tortuous path for the flow of syngas. This forces the syngas to flow towards the opening of the baffle 210 at the opposite end where a very large area exists that will decrease the syngas flow velocity and facilitate removal of entrained liquid content from the syngas. It should be noted herein that the baffle 210 is angled up toward the opposite end of the exit path 208 to facilitate for pressure relief.

Referring to FIG. 20, a faceted baffle 228 is disclosed. In the illustrated embodiment, the faceted baffle 228 includes a chevron type mesh 230 instead of the splash plates illustrated in FIG. 19. The chevron mesh 230 includes a plurality of drainage traps 232 supported by bolts 234. The chevron mesh 230 allows passage of syngas and removes the entrained liquid content from the syngas. In an alternate embodiment, a portion of the plates 214, 216, 218, 220, 222, 224, 226 of the baffle 210 illustrated in FIG. 19 may be partially replaced by the chevron mesh 230.

Referring to FIG. 21, one of the splash plate 214 of the baffle 210 is illustrated. In the illustrated embodiment, a plurality of vertical strips portions are removed from the splash plate 214 to form corresponding cut-out portions 236. A metal piece 238 that is slightly larger in height and width of the cut-out portion 236 is then placed overlapping of each cut-out portion 236. The metal pieces 238 are attached to the splash plate 214 with spacers 240 disposed in-between to allow torturous path for gas flow through the cut-out portions 236 of the plate 214.

Referring to FIG. 22, one of the splash plate 224 is illustrated. In the illustrated embodiment, a plurality of channels or gussets 242 are provided on an inner face of the splash plate 224. The gussets 242 are angled to allow entrained liquid content to flow down the splash plate 224 to the gutters of the baffle.

Referring to FIG. 23, a quench chamber 244 is disclosed. In the illustrated embodiment, a draft tube 246 is positioned surrounding a dip tube 248 in the quench chamber 244. The cooled syngas is passed through an annular passage 250 formed between the dip tube 248 and the draft tube 246 towards an exit path 252 of the quench chamber 244. A baffle 254 is disposed proximate to the exit path 252 in the quench chamber 244. The baffle 254 may be a symmetric baffle or an asymmetric baffle. Additionally, a helical baffle 256 is disposed in the annular passage 250 and may be designed to induce a spiraled or rotational flow pattern of the syngas through the annular passage 250. The rotational flow may increase flow path of the syngas in the quench chamber 244, which in turn may increase the pressure drop to reduce fluid flow fluctuations. Furthermore, the baffle 256 may promote a spiraled flow that may reduce entrainment of water and ash within the syngas. Moreover, the extended flow path of the syngas in the quench chamber 244 may enhance the heat transfer rate. In general, the helical baffle 256 may create a tortuous path for the flow of syngas within the quench chamber 244.

Referring to FIG. 24, a quench chamber 258 is disclosed. In the illustrated embodiment, a draft tube 260 is positioned surrounding a dip tube 262 in the quench chamber 258. The cooled syngas is passed through an annular passage 264 formed between the dip tube 262 and the draft tube 260 towards an exit path 266 of the quench chamber 258. A baffle 268 is disposed proximate to the exit path 266 in the quench chamber 258. The baffle 268 may be a symmetric baffle or an asymmetric baffle. In the illustrated embodiment, the baffle 268 includes an extended portion 270 which may be angled to divert the entrained liquid content away from a lip of the baffles 268 thereby reducing entrainment of liquid content in the exiting syngas.

Referring to FIG. 25, the baffle 268 is illustrated. As discussed previously, the baffle 268 is disposed proximate to the exit path in the quench chamber. In the illustrated embodiment, the baffle 268 includes an extended portion 270 that may extend along approximately one third of an inner circumference 272 of the baffle 268. Moreover, in certain embodiments, the extended portion 146 may include a gutter portion to divert entrained liquid content away from a lower lip of the extended portion 146.

The entrainment mitigation mechanisms depicted in FIGS. 1-25 may be employed separately or in combination with one another. Moreover, as may be appreciated, the relative sizes, shapes, and geometries of the entrainment mitigation mechanisms may vary. The entrainment mitigation mechanisms may be employed in a quench chamber during the initial manufacturing, or the entrainment mitigation mechanisms may be retrofit into existing quench units. Further, the entrainment mitigation mechanisms may be adjusted based on operational parameters, such as the type of carbonaceous fuel, the system efficiency, the system load, or environmental conditions, among others to achieve the desired amount of flow damping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gasifier comprising:
   a combustion chamber for burning a combustible fuel to produce a syngas and a particulated solid residue,
   a quench chamber having a liquid coolant disposed downstream of the combustion chamber,
   a dip tube coupling the combustion chamber to the quench chamber and configured to direct syngas from the combustion chamber to the quench chamber to contact the liquid coolant and produce a cooled syngas;
   an faceted baffle disposed proximate to an exit path of the quench chamber for removing entrained liquid content from the cooled syngas directed through between the dip tube and the quench chamber to the exit path wherein the faceted baffle comprises a plurality of splash plates, wherein each splash plate comprises one or more cut-out portions and one or more overlapping plates, wherein the overlapping plates are disposed overlapping the cut-out portions with a plurality of spacers disposed in between.

2. The gasifier of claim 1, wherein the faceted baffle comprises a closed bottom portion.

3. The gasifier of claim 2, wherein the faceted baffle has an opening disposed opposite to the exit path.

4. The gasifier of claim 1, wherein each splash plate has a plurality of channels for allowing flow of entrained liquid content removed from the cooled syngas.

5. A gasifier comprising:
   a combustion chamber for burning a combustible fuel to produce a syngas and a particulated solid residue,
   a quench chamber having a liquid coolant disposed downstream of the combustion chamber,
   a dip tube coupling the combustion chamber to the quench chamber and configured to direct syngas from the combustion chamber to the quench chamber to contact the liquid coolant and produce a cooled syngas;
   an faceted baffle disposed proximate to an exit path of the quench chamber for removing entrained liquid content from the cooled syngas directed through between the dip tube and the quench chamber to the exit path, wherein the faceted baffle comprises a mesh structure having a plurality of drainage traps supported by one or more bolts.

6. The gasifier of claim 1, wherein the faceted baffle comprises one or more gussets configured to remove entrained liquid content from the cooled syngas.

7. The gasifier of claim 6, wherein the one or more gussets are disposed extending along a portion of an inner circumference of the baffle.

8. The gasifier of claim 1, further comprising a deflector plate disposed between the liquid coolant and the exit path of the quench chamber and configured to remove entrained liquid content from the cooled syngas and prevent sloshing of liquid content to the exit path.

9. The gasifier of claim 1, further comprising a draft tube disposed surrounding the dip tube and defining an annular passage there between, wherein the faceted baffle is configured to remove entrained liquid content from the cooled syngas directed through the annular passage to the exit path.

* * * * *

UNITED STATES PATENT AND TRADEMARK OFFICE
CERTIFICATE OF CORRECTION

PATENT NO. : 8,673,036 B2  
APPLICATION NO. : 13/617704  
DATED : March 18, 2014  
INVENTOR(S) : Tiwari et al.

Page 1 of 1

It is certified that error appears in the above-identified patent and that said Letters Patent is hereby corrected as shown below:

In the Specifications

In Column 4, Line 33, delete "combustion chamber 12" and insert -- combustion chamber 14 --, therefor.

In Column 9, Line 17, delete "exit path 166" and insert -- exit path 164 --, therefor.

In Column 11, Line 32, delete "extended portion 146" and insert -- extended portion 270 --, therefor.

In Column 11, Line 34, delete "extended portion 146." and insert -- extended portion 270. --, therefor.

In the Claims

In Column 12, Line 16, delete "path" and insert -- path, --, therefor.

Signed and Sealed this  
Twentieth Day of May, 2014

Michelle K. Lee  
*Deputy Director of the United States Patent and Trademark Office*